United States Patent [19]

Sakakibara et al.

[11] 4,130,265
[45] Dec. 19, 1978

[54] ELECTRICALLY OPERATED SWITCHING VALVE

[75] Inventors: Naoji Sakakibara, Chiryu; Nobuyuki Hashimoto, Toyota, both of Japan

[73] Assignee: Aisin Seiki Kabushiki Kaisha, Kariya, Japan

[21] Appl. No.: 765,309

[22] Filed: Feb. 3, 1977

[30] Foreign Application Priority Data

Feb. 25, 1976 [JP] Japan .................................. 51-22039

[51] Int. Cl.² ............................................. F16K 31/04
[52] U.S. Cl. ................................. 251/11; 137/625.44; 236/48 R
[58] Field of Search ................. 251/11; 236/48 R; 137/625.44

[56] References Cited

U.S. PATENT DOCUMENTS

| 2,041,775 | 5/1936 | Mottlau | 236/48 R |
| 3,442,483 | 5/1969 | Schwartz | 251/11 |
| 3,464,227 | 9/1969 | Matthies | 251/11 |

*Primary Examiner*—Arnold Rosenthal

*Attorney, Agent, or Firm*—Finnegan, Henderson, Farabow & Garrett

[57] ABSTRACT

An electrically operated switching valve comprising a valve housing provided with a pair of opposed valve ports, a valve member disposed between the valve ports for co-operation therewith and a snap-action valve actuating device for actuating said valve member alternately into engagement with the valve ports. The valve actuating device includes a rectangular plate which is bent in one direction along the longitudinal center line and a strap member extending between diagonally opposite corners of the plate and secured thereto. The strap member has a length which is smaller than the diagonal dimension of the plate so that the plate is deflected under tension applied by the strap member in the opposite direction along the transverse center line of the plate. The strap member is associated with an electric heating wire so that it is heated when the wire is energized. Since the strap member has a coefficient of thermal expansion which is greater than that of the plate so that it is expanded by a greater extent than the plate when heated by the wire allowing the plate to return with snap action to its undeflected position.

7 Claims, 8 Drawing Figures

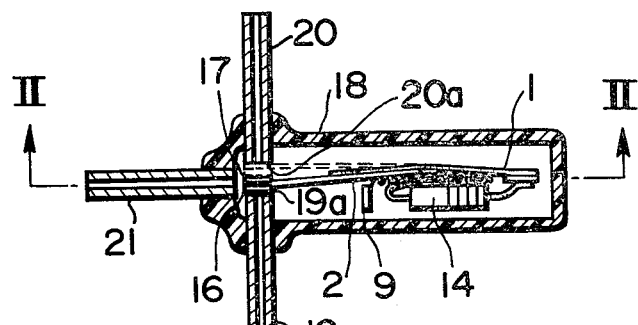
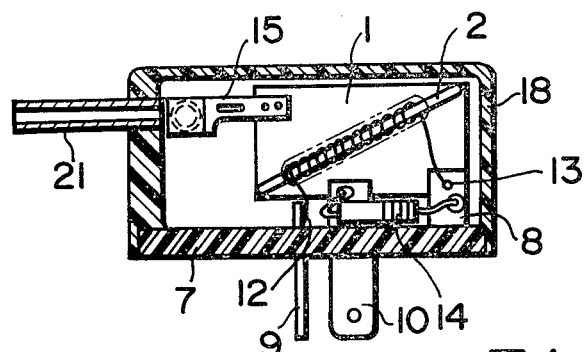
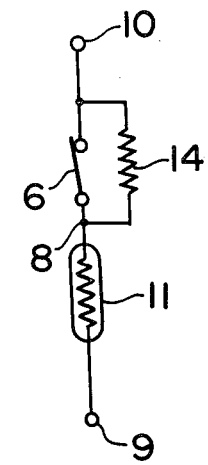
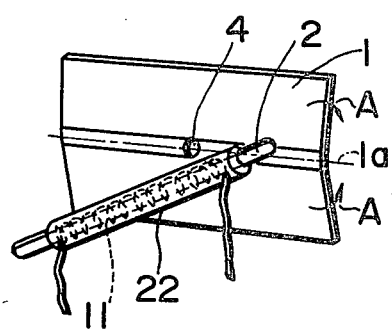
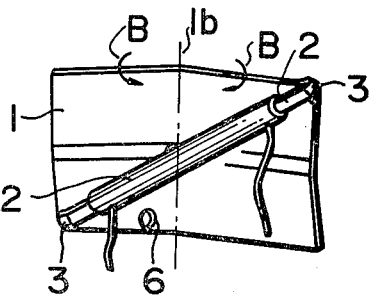

ELECTRICALLY OPERATED SWITCHING VALVE

The present invention relates to an electrically operated valve and more particularly to an electrically operated switching valve.

Conventional electrically operated switching valves have mostly been of a so-called solenoid type in which valve members are actuated under an electromagnetic force. Such solenoid type valves provide satisfactory response to actuating signals, however, they have been found unsatisfactory in that they require a large amount of expensive copper wire and that substantial surge voltage is produced under an electromagnetic induction when solenoid currents are interrupted so that current interrupting devices such as switching transistors may possibly be broken.

The present invention has therefore an object to provide an electrically operated switching valve which is free from the aforementioned disadvantages of the conventional solenoid valve.

Another object of the present invention is to provide an electrically operated switching valve which is suitable for use in applications where a very high responsive rate is not critical.

According to the present invention, the above and other objects can be accomplished by an electrically operated switching valve comprising valve housing means provided with valve port means, valve member means for co-operation with valve seat means formed on said valve port means, valve actuating means for moving said valve member means into and out of engagement with said valve seat means, said valve actuating means including resilient plate means supported at one end on said valve housing means and carrying said valve member means at the other end, strap means having opposite ends secured to the resilient plate means at two spaced apart portions and having a dimension smaller than the distance between said portions under a normal condition so that the plate means is deflected from a normal position, electric heating wire means for heating the strap means when energized, and means for energizing the heating wire means so as to generate heat in the heating wire means for producing thermal expansion of the strap means to allow the resilient plate means to return to its normal undeflected position.

According to a preferable mode of the present invention, the resilient plate means is bent in one direction under an untensioned state and the strap means extends between diagonally opposite corners of the plate means and deflects it in the opposite direction. When the heating wire is energized, the strap is caused to expand under the heat produced by the wire so that the plate is allowed to return with snap action to its normal position. Through the movement of the plate, the valve member carried thereon is brought into and out of engagement with the valve seat. The valve housing may of course include a pair of opposed valve seats and the resilient plate may carry a pair of valve members for co-operation with the valve seats, respectively. In this instance, one of the valve members is held in seating engagement with the corresponding one of the valve seats and the other valve member is out of engagement with the corresponding valve seat when the plate is in the deflected position. When the plate is returned to the normal position, said one valve member is moved apart from the corresponding valve seat and the other valve member into engagement with the corresponding valve seat.

The above and other objects and features of the present invention will become apparent from the following descriptions of preferred embodiments taking reference to the accompanying drawings, in which;

FIG. 1 is a sectional view showing an electrically operated switching valve assembly in accordance with one embodiment of the present invention;

FIG. 2 is a sectional view taken substantially along the line II—II in FIG. 1;

FIG. 3 is an exploded perspective view showing a valve actuating device used in the valve assembly shown in FIGS. 1 and 2;

FIG. 4 is a perspective view showing the valve actuating device in assembled condition;

FIG. 5 is a circuit diagram showing the energizing electric circuit;

Figure 6:
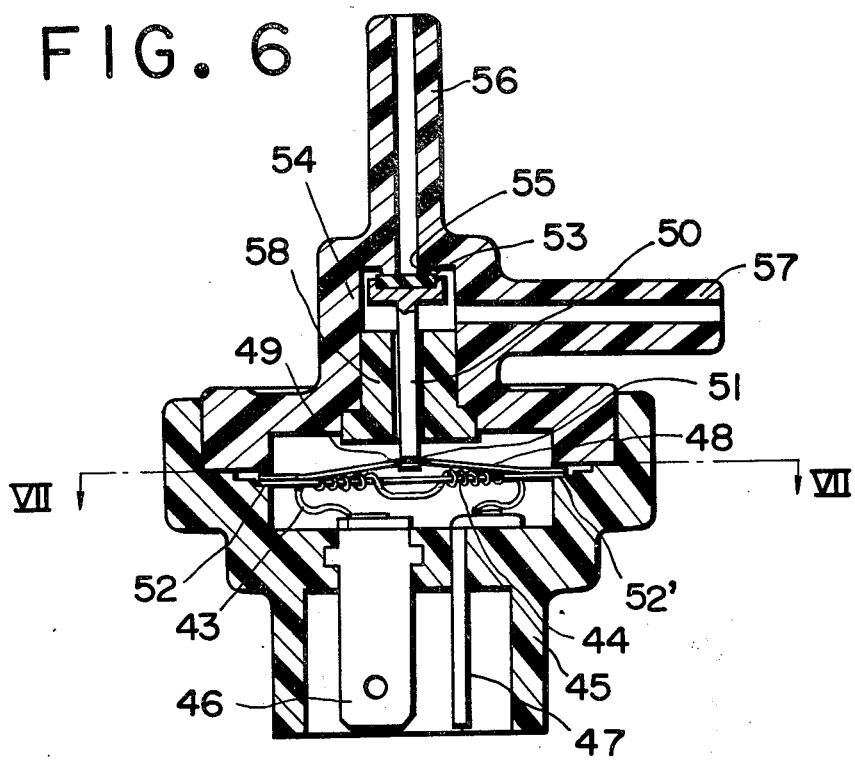
FIG. 6 is a sectional view of an electrically operated switching valve assembly in accordance with another embodiment of the present invention.

Referring now to the drawings, particularly to FIGS. 1 and 2, an electrically operated switching valve assembly shown therein includes a hollow housing 18 provided with a pair of opposed pipes 19 and 20 having a pair of opposed valve seats 19a and 20a, respectively. The housing 18 is further provided with a pipe 21.

Within the valve housing 18, there is disposed a valve actuating device including a substantially rectangular resilient plate 1 which is supported at one corner on the valve housing by a conductive plate 8. The resilient plate 1 has a valve member 15 carrying a pair of valve pads 16 and 17 for co-operation with the valve seats 19a and 20a, respectively.

As shown in FIG. 3, the plate 1 is bent in the direction shown by arrows A along the longitudinal center line 1a and has a hole 4 formed at the center thereof. The plate 1 is made of a spring material such as for example stainless steel or bainite steel and may be produced through punching operation. As shown in FIG. 4, a strap member 2 extends between diagonally opposite corners 3 of the plate and secured thereto by for example welding. The strap member 2 is made of a material having a thermal expansion coefficient such as nickel alloy steel or stainless steel, and has a longitudinal dimension smaller than the distance between the diagonally opposite corners 3 of the plate 1 under a normal temperature condition. Thus, the resilient plate 1 is caused under the tension applied thereto by the strap member 2 to deflect substantially along the transverse center line 1b in the direction shown by arrows B.

On the strap member 2, there is wound an electric heating wire 11 which is coated by a sheath 22 of an insulating material such as silicon rubber. Therefore, it will be understood that the heating wire 11 applies heat, when energized, to the strap member 2 causing the latter to expand longitudinally, so that the resilient plate 1 is allowed to return with snap action to the position shown in FIG. 1.

Referring back to FIG. 2, the valve housing 18 is provided with a pair of electric terminals 9 and 10. The terminal 9 is connected to one end 12 of the heating wire 11 and the terminal 10 through a resistor 14 and the conductive support 8 with the opposite end 13 of the wire 11. The plate 1 is further provided with a contact 6 which engages with the conductive terminal 10 when the plate 1 is in the deflected position shown in FIG. 4. Thus, a circuit is established in the valve assembly as shown in FIG. 5.

In operation, the resilient plate 1 is normally in the deflected position under the tension applied by the strap member 2, and it will therefore be seen in FIG. 1 that the valve pad 16 is in engagement with the valve seat 19 a to close the pipe 19. Thus, the pipe 21 is in communication through the interior of the valve housing 18 with the pipe 20. When it is desired to switch over the valve, an electric power is supplied to the terminals 9 and 10 to energize the heating wire 11. Thus, heat is applied to the strap member 2 to cause longitudinal expansion thereof. The plate 1 is therefore allowed, under its own nature, to return to its normal undeflected position until the valve pad 16 is moved apart from the valve seat 19a and the valve pad 17 is brought into engagement with the valve seat 20a. Thus, the pipe 21 is now disconnected from the pipe 20 and connected with the pipe 19. As previously described, the contact 6 on the plate 1 is simultaneously disengaged from the terminal 10 at this moment so that current is thereafter supplied to the heating wire 11 only through the resistor 14. Therefore, the valve member 15 can be maintained in the actuated position by a current of smaller value.

Figure 7:
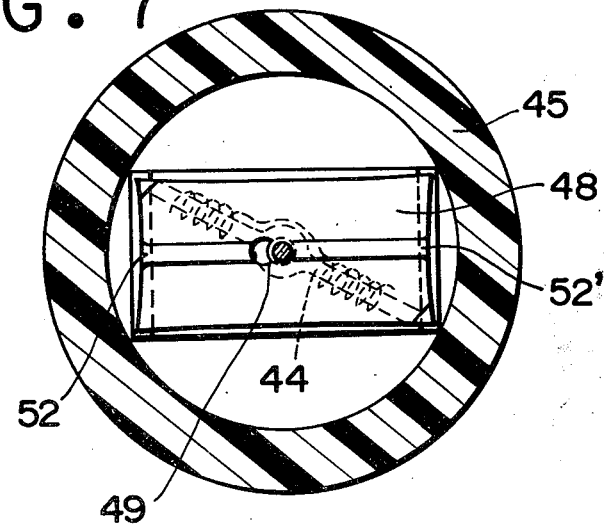
FIG. 7 is a sectional view taken substantially along the line VII—VII in FIG. 6; and, FIG. 8 is a sectional view of an electrically operated switching valve assembly in accordance with a further embodiment of the present invention.

Referring now FIGS. 6 and 7 which show the second embodiment of the present invention, it will be see that the valve actuating device in this embodiment is similar to that in the previous embodiment and includes a resilient plate 48 having a strap member 44 secured to the plate 48 and associated with an electric heating wire 43.

The valve assembly includes a housing 45 which is connected with a valve housing 54 with the resilient plate 1 loosely held therebetween at the longitudinally opposite edges 52 and 52′. The valve housing 54 is formed with two hollow pipe portions 56 and 57. A valve seat 55 is formed at the inner end of the pipe portion 56.

A valve member 50 having a valve pad 53 is axially movably supported in the valve housing 54 by means of a guide bush 58. The resilient plate 48 is formed at the center thereof with a hole 49 which corresponds to the hole 4 in the previous embodiment and in the conbiguration of FIG. 8 in this embodiment. The valve member 50 has a circumferential groove 51 at the end opposite to the valve pad 53 for slidable engagement with the hole 49 in the plate 48. Thus, the valve pad 53 carried by the valve member 50 is moved by the resilient plate 48 into and out of seating engagement with the valve seat 55.

The housing 45 is provided with a pair of conductive terminals 46 and 47 which are respectively connected with the opposite ends of the heating wire 43.

In this embodiment, the resilient plate 48 is in the deflected position under the tension applied by the strap member 44 as shown in FIG. 6 so that the valve member 50 is forced upwards until the valve pad 53 engages with the valve seat 55. When the heating wire 43 is energized, the strap member 44 expands longitudinally so that the resilient plate 48 is allowed to return to its undeflected position. Therefore, the valve pad 53 is moved apart from the valve seat 55.

Figure 8:
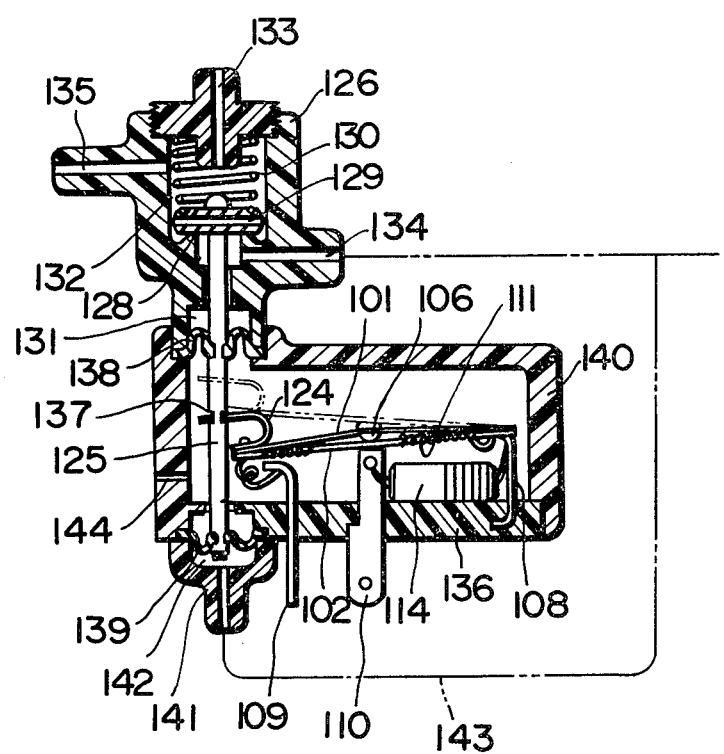

Referring now to FIG. 8, the valve assembly shown therein includes a valve actuating device which is similar in structure to those in the previous embodiments and comprises a resilient plate 101, a strap member 102 secured at the opposite ends to the resilient plate 101 and electric heating wire 111. The device is housed in a housing 140 housing a bottom cover 136.

A valve housing 126 is mounted on the housing 140 and formed with a valve chamber 132 communicating with the exterior of the valve housing 126 through three valve ports 133, 134 and 135. The valve housing 126 is further provided with a valve seat 128 between the valve port 134 and the valve chamber 132, and a valve member 129 is disposed in the valve chamber 132 for co-operation with the valve seat 128. A resilient bias spring 130 is provided in the chamber 132 for biasing the valve member 129 into engagement with the valve seat 128.

A valve stem 125 extends through the housing 140 into the valve housing 126 and has an upper end which is in contact engagement with the valve member 129. The plate 101 is supported at one end on the bottom plate 136 of the housing 140 by a conductive support plate 108, and carries at the other end an actuating plate 124 which engages with the valve stem 125 through a circumferential groove 137 formed in the stem.

The valve stem 125 has a diaphragm 138 which is mounted between the housing 126 and 140 to define a chamber 131 which is in communication with the valve seat 128. The valve stem 125 further carries a diaphragm 139 at the lower end thereof. The diaphragm 139 has an effective area which is equal to that of the diaphragm 138 and is mounted on the housing 140 by a cap 141 which defines a chamber 142. The chamber 142 is connected through a line 143 with the valve port 134. The housing 140 is formed with a vent hole 144 so that the inside of the housing 140 is maintained at on atmospheric pressure.

The bottom plate 136 of the housing 140 is provided with a pair of electrically conductive terminals 109 and 110. The terminal 109 is connected to one end of the heating wire 102 and the terminal 110 with the other end through a resistor 114 and the conductive support 108. Further, the resilient plate 101 carries a contact 106 which is brought into engagement with the terminal 110 when the plate 101 is in the deflected position as shown by solid lines in FIG. 8. Thus, an electric circuit is formed as shown in FIG. 5.

In this embodiment, the valve actuating device is mounted outside the valve housing so that it is not affected by the fluid flowing through the valve housing. Therefore, the heating wire may not necessarily be coated with a sheath material.

In operation, when the heating wire 111 is deenergized, the plate 101 is deflected under the tension applied by the strap member so that the valve stem 125 is shifted downwards. Thus, the valve member 129 is maintained in engagement with the valve seat under the action of the spring 130.

When the heating wire 111 is energized, the strap member 102 is heated and longitudinal expansion is produced therein. The resilient plate 101 is allowed to return to its undeflected position as shown by dotted lines in FIG. 8. The valve stem 125 is therefore shifted upwards to force the valve member 129 apart from the valve seat 128 against the action of the spring 130 until the member 129 closes the port 133.

Fluid from the port 135 is then allowed to flow into the port 134. The fluid pressure may be introduced through a gap or clearance between the valve housing 126 and the valve stem 125 into the chamber 131, however, this will have no effect on the position of the valve stem 125 since the chamber 142 is also subjected to the same fluid pressure.

According to the present invention, since it is not necessary to rely on electromagnetic force to actuate the valve member, electric power consumption can significantly be decreased and the valve actuating device can be made small as compared with conventional solenoid type valves, although there may be a slight delay in operation. Further, the valve actuating device in accordance with the present invention is advantageous over conventional bimetal devices in respect of manufacturing cost and versatility of selection of materials.

The invention has thus been shown and described with reference to specific embodiments, however, it should be noted that the invention is in no way limited to the details of the illustrated structures but changes and modifications may be made without departing from the scope of the appended claims.

We claim:

1. Electrically operated switching valve comprising valve housing means provided with valve port means, valve member means for co-operation with valve seat means formed on said valve port means, valve actuating means for moving said valve member means into and out of engagement with said valve seat means, said valve actuating means including resilient plate means supported on said valve housing means and carrying said valve member means, strap means having opposite ends rigidly secured to the resilient plate means at two spaced apart portions and having a dimension smaller than the distance between said portions under a normal condition so that the plate means is deflected from a normal position, electric heating wire means for heating the strap means when energized, and means for energizing the heating wire means so as to generate heat in the heating wire means for producing thermal expansion of the strap means to allow the resilient plate means to return to its normal undeflected position.

2. Electrically operated switching valve in accordance with claim 1 in which said resilient plate means includes a rectangular plate having a longitudinal center line and being bent under an untensioned state in one direction along the longitudinal center line, said strap means extending between diagonally opposite corners of the rectangular plate to deflect it in the opposite direction along a line perpendicular to the longitudinal center line.

3. Electrically operated switching valve in accordance with claim 2 in which said rectangular plate is provided with a hole at the center thereof for facilitating the deflection under tension of the strap menas.

4. Electrically operated switching valve in accordance with claim 1 in which said heating wire means is wound around said strap means and coated with an electrically insulating sheath.

5. Electrically operated switching valve in accordance with claim 1 in which said valve housing means includes a pair of opposed valve ports and the valve member means is positioned between the valve ports so as to alternately close the valve ports.

6. Electrically operated switching valve in accordance with claim 1 in which said valve actuating means is disposed in valve chamber defined in said valve housing means.

7. Electrically operated switching valve in accordance with claim 1 in which said valve actuating means is disposed out of valve chamber defined in said valve housing.

* * * * *